F. W. FABER.
VEHICLE-SPRING.
No. 191,040. Patented May 22, 1877.
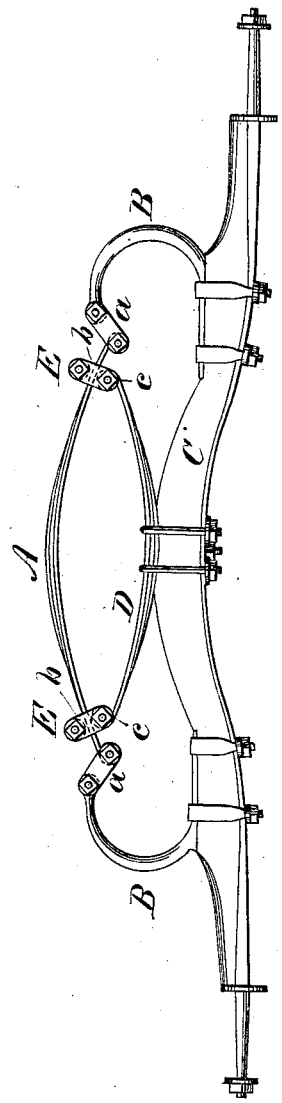
WITNESSES:
INVENTOR:
ATTORNEYS.

UNITED STATES PATENT OFFICE.

FREDRICK W. FABER, OF COLUMBUS, TEXAS.

IMPROVEMENT IN VEHICLE-SPRINGS.

Specification forming part of Letters Patent No. 191,040, dated May 22, 1877; application filed March 12, 1877.

*To all whom it may concern:*

Be it known that I, FREDRICK W. FABER, of Columbus, in the county of Colorado and State of Texas, have invented a new and Improved Vehicle-Spring, of which the following is a specification:

My invention consists in combining an auxiliary spring with a spring suspended from goose-necks attached to the axle, the said auxiliary spring being attached to the axle, and provided with yokes for embracing the suspended spring, the object being to provide a device for steadying the main spring and preventing lateral motion.

Referring to the drawing, which is a side elevation of my improved spring attached to an axle, A is a semi-elliptical spring suspended by links $a$ from goose-necks B that are attached to the axle C by clips in the usual way. D is a semi-elliptical spring that is shorter than the spring A, and is firmly attached to the axle C by means of clips, and is provided at each end with yokes E, which consist of two links, $b$, having between them a thimble, and which are held together by a bolt which passes through the links and thimble, or it may consist of a yoke of malleable iron cast in a single piece. The said yokes are secured to the ends of the spring D by bolts $c$ that pass through the yokes and through loops formed in the ends of the spring.

The yokes E are free to swing on the bolts $c$, but embrace the sides of the spring A, so that it cannot move laterally.

Having thus described my invention, I claim as new and desire to secure by Letters Patent—

The combination of the spring D, yokes E, and the ordinary suspended spring A, substantially as herein shown and described.

FREDRICK W. FABER.

Witnesses:
 GEO. WITTING,
 L. WEST.